(12) United States Patent
Tsuru

(10) Patent No.: US 8,774,265 B2
(45) Date of Patent: Jul. 8, 2014

(54) ENCODING APPARATUS, DECODING APPARATUS, ENCODING METHOD, DECODING METHOD, PROGRAM OF ENCODING METHOD, PROGRAM OF DECODING METHOD, RECORDING MEDIUM IN WHICH PROGRAM OF ENCODING METHOD IS RECORDED, AND RECORDING MEDIUM IN WHICH PROGRAM OF DECODING METHOD IS RECORDED

(75) Inventor: Daisuke Tsuru, Tokyo (JP)

(73) Assignee: Sony Corporation (JP)

( * ) Notice: Subject to any disclaimer, the term of this patent is extended or adjusted under 35 U.S.C. 154(b) by 1865 days.

(21) Appl. No.: 11/698,725

(22) Filed: Jan. 26, 2007

(65) Prior Publication Data

US 2007/0291840 A1 Dec. 20, 2007

(30) Foreign Application Priority Data

Jan. 30, 2006 (JP) ................................ P2006-020696

(51) Int. Cl.
*H03M 3/04* (2006.01)

(52) U.S. Cl.
USPC .......................................... 375/240; 375/246

(58) Field of Classification Search
CPC .................................... H04B 1/66; H04N 5/04
See application file for complete search history.

(56) References Cited

U.S. PATENT DOCUMENTS

| | | | | |
|---|---|---|---|---|
| 4,330,689 A * | 5/1982 | Kang et al. | ..................... | 704/219 |
| 4,670,875 A * | 6/1987 | Nassar | ............................ | 370/525 |
| 5,216,503 A * | 6/1993 | Paik et al. | ................... | 348/390.1 |
| 6,097,676 A * | 8/2000 | Fujinami | ..................... | 369/30.04 |
| 6,421,387 B1 * | 7/2002 | Rhee | ......................... | 375/240.27 |
| 6,987,535 B1 * | 1/2006 | Matsugu et al. | .............. | 348/239 |
| 6,993,074 B2 * | 1/2006 | Zhang et al. | ............. | 375/240.11 |
| 8,054,880 B2 * | 11/2011 | Yu et al. | .................... | 375/240.03 |
| 8,311,088 B2 * | 11/2012 | Lu et al. | ......................... | 375/240 |
| 2003/0214949 A1 * | 11/2003 | Shaikli | .......................... | 370/394 |
| 2005/0207490 A1 * | 9/2005 | Wang et al. | .............. | 375/240.15 |
| 2006/0146138 A1 * | 7/2006 | Xin et al. | .................. | 348/207.99 |
| 2007/0025688 A1 * | 2/2007 | Pejhan | ............................ | 386/68 |
| 2011/0181700 A1 * | 7/2011 | Oshima et al. | ................... | 348/43 |

FOREIGN PATENT DOCUMENTS

| | | |
|---|---|---|
| JP | 6-070302 A | 3/1994 |
| JP | 11-027662 A | 1/1999 |
| WO | 2005104551 A2 | 11/2005 |

OTHER PUBLICATIONS

European Search Report EP 07000917, dated Jan. 23, 2012.
Barbero M et al: "A Codec for HDTV Transmission", Signal Processing of HDTV, 3. Turin, Sep. 4-6, 1991; [Proceedings of the International Workshop on HDTV and Beyond], Amsterdam, Elsevier, NL, vol. Workshop 4, Sep. 4, 1991, pp. 259-266, XP 000379960.

* cited by examiner

*Primary Examiner* — Eleni Shiferaw
*Assistant Examiner* — Phy Anh Vu
(74) *Attorney, Agent, or Firm* — Lerner, David, Littenberg, Krumholz & Mentlik, LLP

(57) ABSTRACT

The present invention provides an encoding apparatus that executes encoding processing for input video data, including: a distributor configured to distribute the input video data into a plurality of channels on a picture basis; and a plurality of encoders configured to be provided on the plurality of channels and each execute encoding processing for video data of a corresponding one of the channels output from the distributor.

15 Claims, 9 Drawing Sheets

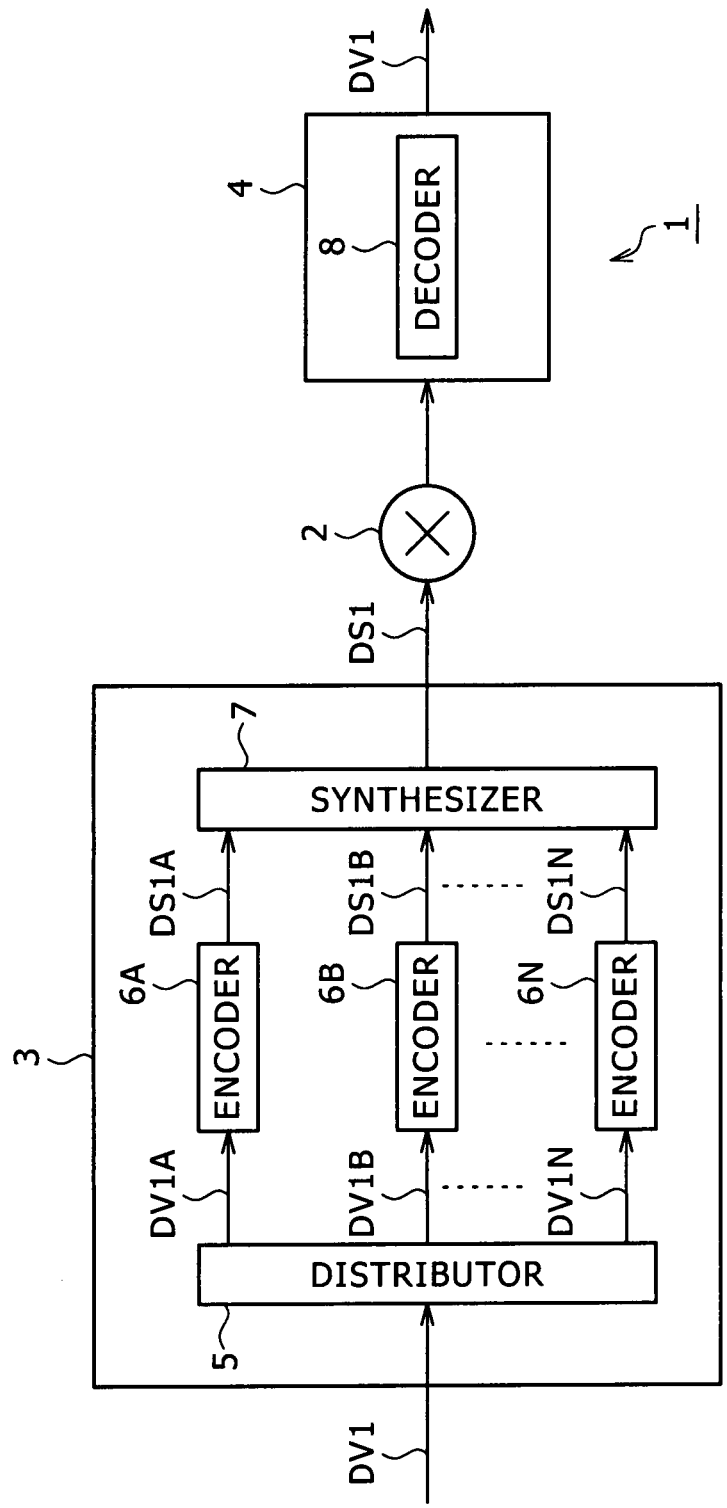

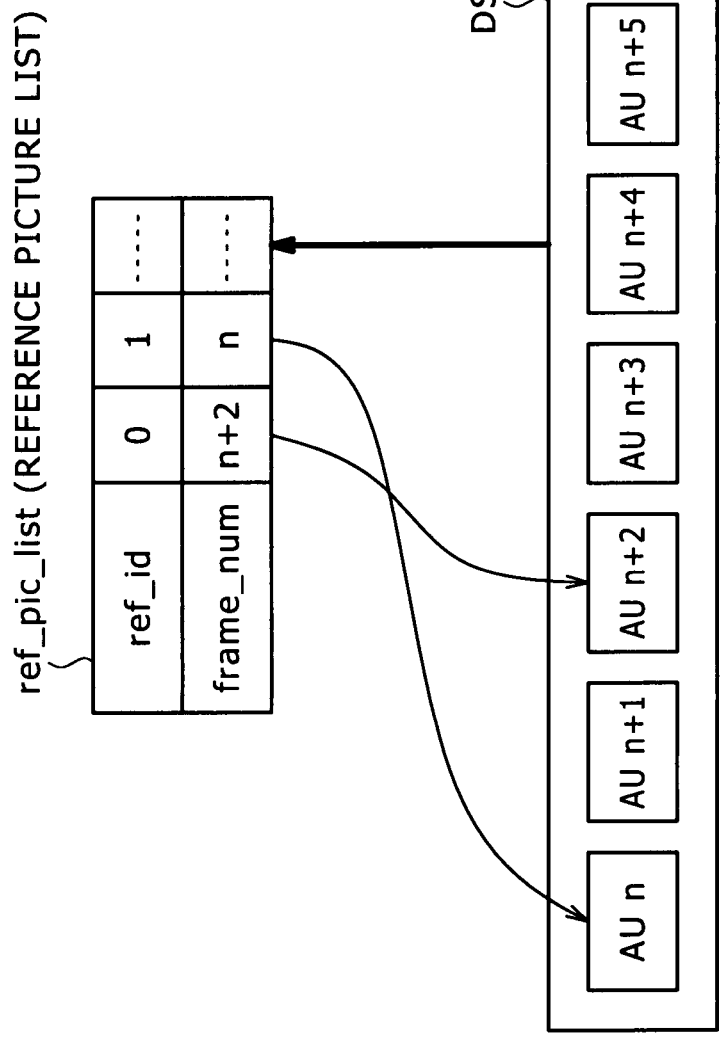

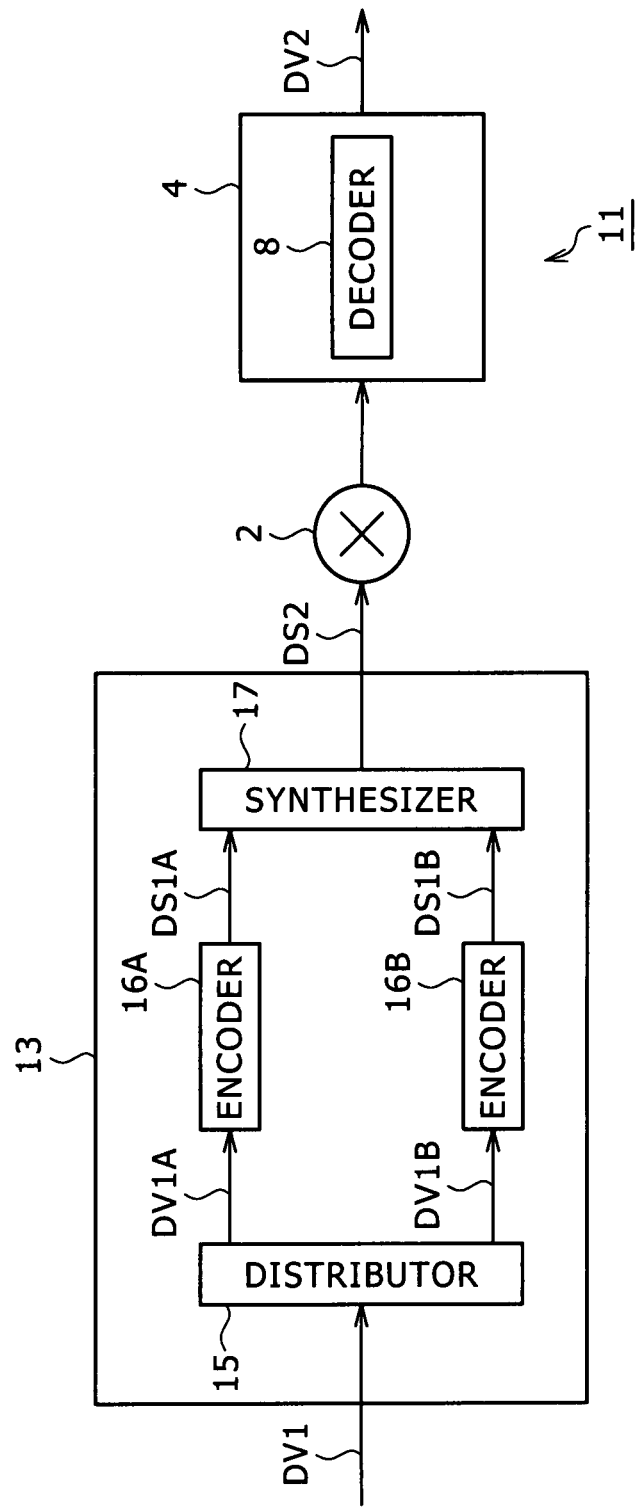

ENCODING APPARATUS, DECODING APPARATUS, ENCODING METHOD, DECODING METHOD, PROGRAM OF ENCODING METHOD, PROGRAM OF DECODING METHOD, RECORDING MEDIUM IN WHICH PROGRAM OF ENCODING METHOD IS RECORDED, AND RECORDING MEDIUM IN WHICH PROGRAM OF DECODING METHOD IS RECORDED

CROSS REFERENCES TO RELATED APPLICATIONS

The present invention contains subject matter related to Japanese Patent Application JP 2006-020696 filed in the Japanese Patent Office on Jan. 30, 2006, the entire contents of which being incorporated herein by reference.

BACKGROUND OF THE INVENTION

1. Field of the Invention

The present invention relates to an encoding apparatus, a decoding apparatus, an encoding method, a decoding method, a program of an encoding method, a program of a decoding method, a recording medium in which a program of an encoding method is recorded, and a recording medium in which a program of a decoding method is recorded. The invention can be applied to processing of video data in accordance with e.g. H.264 recommended by ITU (International Telecommunication Union)-T (hereinafter, referred to simply as H.264). According to embodiments of the invention, input video data and input encoded data are distributed into plural channels on a picture basis, and the data of each channel is encoded and decoded. This scheme allows video data at a high frame rate to be encoded and decoded with use of units each involving difficulty in high-speed processing.

2. Description of the Related Art

In recent years, in transmission of moving images and so on, NTSC (National Television System Committee) video signals are encoded in accordance with H.264. In the H.264, a larger number of prediction modes are available and a larger number of reference pictures can be used, compared with MPEG (Moving Picture Experts Group) 2.

Furthermore, in recent years, improvements to increase the frame rate of video signals to thereby enhance the image quality have been proposed for video apparatuses. In e.g. Japanese Patent Laid-open No. 2005-198269, an improvement to convert a video signal at a high frame rate into a video signal at a low frame rate has been proposed.

When a video signal at a high frame rate is encoded, the information amount is larger than that when an NTSC video signal is encoded, which imposes a significantly heavier burden on the encoding apparatus. As a result, the encoding processing for video data at a high frame rate problematically may need a high-performance encoding apparatus that can execute high-speed processing. In addition, the decoding side also needs a high-performance device that can execute high-speed processing.

SUMMARY OF THE INVENTION

The present invention is made in view of the above-described problem. There is a need for the invention to provide an encoding apparatus, a decoding apparatus, an encoding method, a decoding method, a program of an encoding method, a program of a decoding method, a recording medium in which a program of an encoding method is recorded, and a recording medium in which a program of a decoding method is recorded, that each allow video data at a high frame rate to be encoded and decoded with use of units each involving difficulty in high-speed processing.

To meet the above-described need, according to an embodiment of the present invention, an encoding apparatus includes a distributor configured to distribute input video data into a plurality of channels on a picture basis, and a plurality of encoders configured to be provided on the plurality of channels and each execute encoding processing for video data of a corresponding one of the channels output from the distributor.

According to an embodiment of the invention, a decoding apparatus includes a distributor configured to distribute input encoded data into a plurality of channels on a picture basis, and a plurality of decoders configured to be provided on the plurality of channels and each execute decoding processing for encoded data of a corresponding one of the channels output from the distributor.

According to an embodiment of the invention, an encoding method includes the steps of distributing input video data into a plurality of channels on a picture basis, and encoding video data of each of the channels obtained through the step of distributing.

According to an embodiment of the invention, a decoding method includes the steps of distributing input encoded data into a plurality of channels on a picture basis, and decoding encoded data of each of the channels obtained through the step of distributing.

According to an embodiment of the invention, a program of an encoding method includes the steps of distributing input video data into a plurality of channels on a picture basis, and encoding video data of each of the channels obtained through the step of distributing.

According to an embodiment of the invention, a program of a decoding method includes the steps of distributing input encoded data into a plurality of channels on a picture basis, and decoding encoded data of each of the channels obtained through the step of distributing.

According to an embodiment of the invention, a recording medium in which a program of an encoding method is recorded includes the steps of distributing input video data into a plurality of channels on a picture basis, and encoding video data of each of the channels obtained through the step of distributing.

According to an embodiment of the invention, a recording medium in which a program of a decoding method is recorded includes the steps of distributing input encoded data into a plurality of channels on a picture basis, and decoding encoded data of each of the channels obtained through the step of distributing.

According to the configuration of the embodiment of the present invention, input video data is distributed into plural channels by the distributor so as to be converted into video data at a low frame rate, so that each of the video data at a low frame rate is encoded by the encoder. This configuration can provide an encoding apparatus that can encode input video data at a high frame rate that is difficult for the encoder to process.

According to the configuration of the embodiment of the present invention, input encoded data is distributed into plural channels by the distributor so as to be converted into encoded data at a low frame rate, so that each of the encoded data at a low frame rate is decoded by the decoder. This configuration can provide a decoding apparatus that can decode input encoded data at a high frame rate that is difficult for the decoder to process.

According to the configurations of the embodiment of the present invention, input video data is distributed into plural channels in the step of distributing so as to be converted into video data at a low frame rate, so that each of the video data at a low frame rate is encoded in the step of encoding.

These configurations can provide an encoding method, a program of an encoding method, and a recording medium in which a program of an encoding method is recorded, that each can execute encoding processing for input video data at a high frame rate that is difficult to directly encode.

According to the configurations of the embodiment of the present invention, input encoded data is distributed into plural channels in the step of distributing so as to be converted into encoded data at a low frame rate, so that each of the encoded data at a low frame rate is decoded in the step of decoding. These configurations can provide a decoding method, a program of a decoding method, and a recording medium in which a program of a decoding method is recorded, that each can execute decoding processing for input encoded data at a high frame rate that is difficult to directly decode.

According to the embodiment of the present invention, video data at a high frame rate can be encoded and decoded with use of units each involving difficulty in high-speed processing.

BRIEF DESCRIPTION OF THE DRAWINGS

FIG. 1 is a block diagram showing a moving image transmission system according to a first embodiment of the present invention;

FIGS. 5A and 5B are schematic diagrams for explaining setting of a reference picture list in the moving image transmission system of FIG. 1;

FIG. 6 is a block diagram showing a moving image transmission system according to a second embodiment of the invention;

DETAILED DESCRIPTION OF THE PREFERRED EMBODIMENTS

Figures 2A, 2B, 2C:
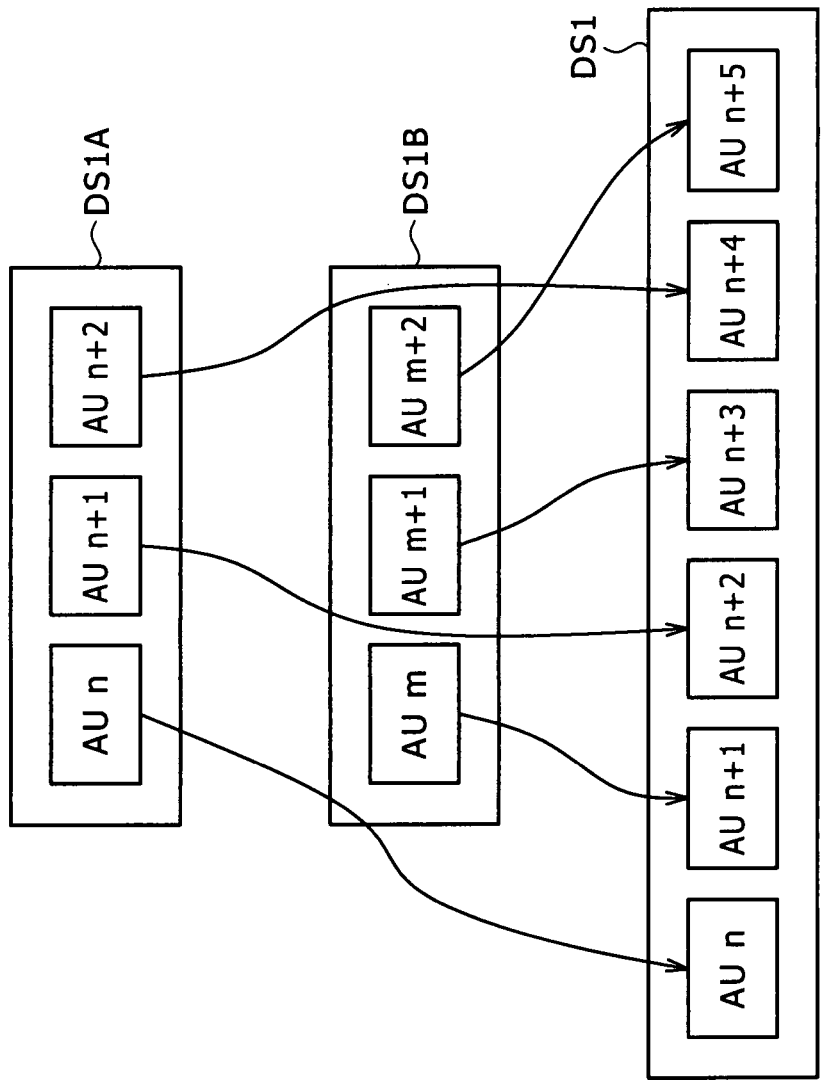
FIGS. 2A to 2C are schematic diagrams for explaining processing of synthesizing video data in the moving image transmission system of FIG. 1.

Embodiments of the present invention will be described in detain below with reference to the accompanying drawings.

First Embodiment (1) Configuration of Embodiment

FIG. 1 is a block diagram showing a moving image transmission system according to a first embodiment of the invention. A moving image transmission system 1 transmits moving images at a high frame rate from a sending apparatus 3 to a receiving apparatus 4 via a communication path 2.

To the sending apparatus 3, input video data DV1 at a frame rate of e.g. 120 [fps] is input from a video apparatus such as an optical disk player. The sending apparatus 3 executes encoding processing for the input video data DV1 based on an encoding scheme in which a picture other than the pictures that are immediately previous and subsequent to the current picture is also available as the reference picture, to thereby produce a bit stream DS1. As this encoding scheme, the H.264 encoding scheme is employed in the sending apparatus 3.

Before the encoding processing in accordance with H.264, the sending apparatus 3 distributes data from the input video data DV1 sequentially and cyclically on a picture basis and temporally expands the respective distributed data, to thereby produce video data DV1A, DV1B, ..., and DV1N of plural channels. Furthermore, the sending apparatus 3 executes encoding processing for the video data DV1A, DV1B, ..., and DV1N of the respective channels in encoders 6A to 6N, respectively. Subsequently, the sending apparatus 3 temporally compresses the encoded data and synthesizes the encoded data into single-channel data. The sending apparatus 3 transmits the encoded data DS1 resulting from the synthesis to the communication path 2 via its communication unit (not shown).

Specifically, in the sending apparatus 3, a distributor 5 distributes the respective pictures of the input video data DV1 sequentially and cyclically and temporally expands the distributed pictures, to thereby output the video data DV1A, DV1B, ..., and DV1N of plural channels. More specifically, the distributor 5 distributes the m-th picture of the input video data DV1 to the video data DV1A of the first channel, and distributes the subsequent m+1-th picture to the video data DV1B of the second channel. Furthermore, the distributor 5 distributes the subsequent m+2-th picture to the video data DV1C of the third channel.

The encoders 6A to 6N execute encoding processing for the video data DV1A, DV1B, ..., and DV1N of the respective channels in accordance with H.264, and output encoded data DS1A, DS1B, ..., and DS1N.

The synthesizer 7 temporally compresses the encoded data DS1A, DS1B, ..., and DS1N, and then selects the resultant data sequentially and cyclically on a picture basis correspondingly to the distribution of the input video data DV1 by the distributor 5, so that the plural encoded data DS1A, DS1B, ..., and DS1N are synthesized into the single-channel encoded data DS1.

Furthermore, the synthesizer 7 redefines the information that indicates the relationship among the respective pictures, set in the single-channel encoded data DS1, or redefines in advance the information that indicates the relationship among the respective pictures, set in the encoded data DS1A, DS1B, ..., and DS1N of the plural channels. This allows the single-channel encoded data DS1 resulting from the synthesis to be decoded by one decoder in accordance with H.264.

Specifically, the synthesizer 7 redefines frame identifiers (frame num) that specify the respective pictures, as the information that indicates the relationship among the pictures, so that the respective pictures of the synthesized encoded data DS1 can be specified.

More specifically, in H.264, a frame identifier (frame num), which is an identifier unique to a picture, is set in a slice header of each access unit. The frame identifier (frame num) allows the picture to be specified. Therefore, in the encoded data DS1A, DS1B, ..., and DS1N arising from the encoding processing in the encoders 6A to 6N, respectively, in accordance with H.264, frame identifiers (frame num) unique to the respective encoded data DS1A, DS1B, . . . , and DS1N are assigned to the respective pictures.

The synthesizer 7 redefines frame identifiers (frame num) for the single-channel encoded data DS1 resulting from the synthesis so that the numbers of the identifiers consecutively change on each picture basis in the encoded data DS1. That is, the frame identifiers (frame num) unique to the respective encoded data DS1A, DS1B, . . . , and DS1N are changed to the frame identifiers (frame num) unique to the single-channel encoded data DS1.

FIGS. 2A to 2C are schematic diagrams showing the setting of frame identifiers (frame num) by the synthesizer 7, for a case example where encoded data DS1A and DS1B of two channels are synthesized. In the example of FIGS. 2A to 2C, frame identifiers (frame num) having consecutive values AUn, AUn+1, AUn+2, . . . are sequentially assigned to the respective pictures of the encoded data DS1A of one channel (FIG. 2A). In addition, frame identifiers (frame num) having consecutive values AUm, AUm+1, AUm+2, . . . are sequentially assigned to the respective pictures of the encoded data DS1B of the other channel (FIG. 2B).

As indicated by the arrowheads, the synthesizer 7 combines these encoded data DS1A and DS1B of two channels to produce single-channel encoded data DS1 in such a manner that the respective pictures of the encoded data DS1A and DS1B are alternately arranged in the synthesized encoded data DS1 (FIG. 2C). Furthermore, the synthesizer 7 redefines frame identifiers (frame num) so that the values of the frame identifiers (frame num) of the respective pictures in the encoded data DS1 vary sequentially and consecutively on a picture basis as indicated by the values AUn, AUn+1, AUn+2, AUn+3, AUn+4, . . . .

In addition, the synthesizer 7 redefines a reference picture list (ref pic list) that specifies the reference pictures, as the information that indicates the relationship among the pictures, so that the reference relationship in the synthesized encoded data DS1 can be correctly specified.

Specifically, in H.264, a reference frame to which a macroblock refers is specified by a reference frame identifier (ref id) and a reference picture list (ref pic list).

Figure 3:
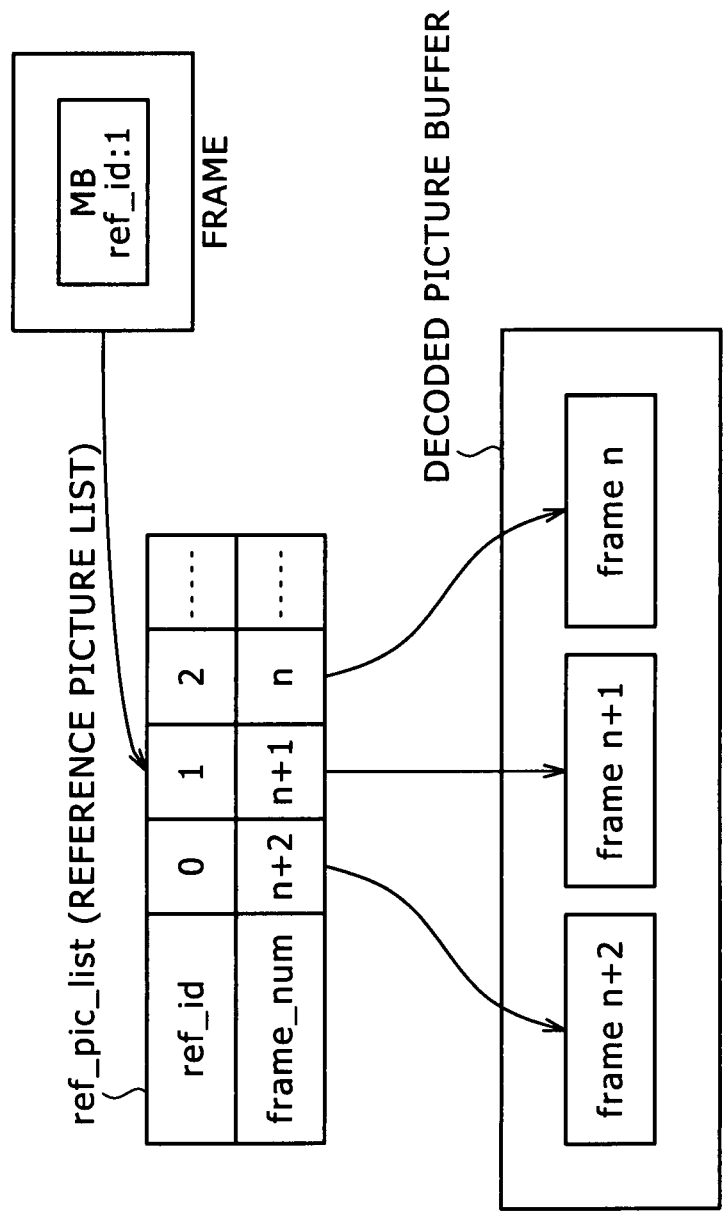
FIG. 3 is a schematic diagram for explaining a reference picture list.

As shown in FIG. 3, the reference picture list (ref pic list) is a list that includes the frame identifiers (frame num) corresponding to the reference frame identifiers (ref id) of plural past frames, and this list is set in a slice header. In an encoding apparatus and decoding apparatus in accordance with H.264, the pictures having the frame identifiers (frame num) set in the reference picture list (ref pic list) are stored in a buffer for reference pictures (Decoded Picture Buffer) and used for encoding and decoding of other pictures.

In each macroblock (MB), of the reference frame identifiers (ref id) set in the reference picture list (ref pic list), the reference frame identifier (ref id) corresponding to the reference picture to which the macroblock is to refer is set.

In the example of FIG. 3, the reference frame identifier (ref id) having a value of 1 is assigned to the macroblock (MB), and the frame identifier (frame num) with a value of n+1 is associated with this reference frame identifier (ref id) of the value 1 in the reference picture list (ref pic list). Therefore, this macroblock (MB) refers to the picture having the frame identifier (frame num) of the value n+1, stored in the buffer (Decoded Picture Buffer).

Figure 4A:
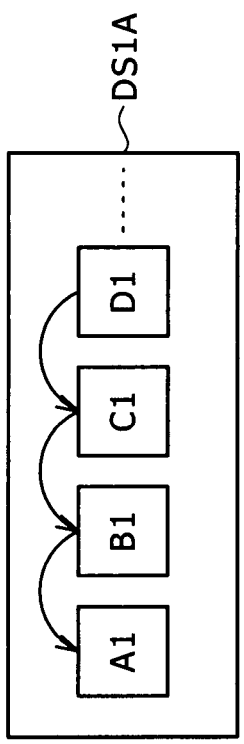
FIGS. 4A to 4C are schematic diagrams for explaining the reference relationship in the moving image transmission system of FIG. 1.
Figure 4B:
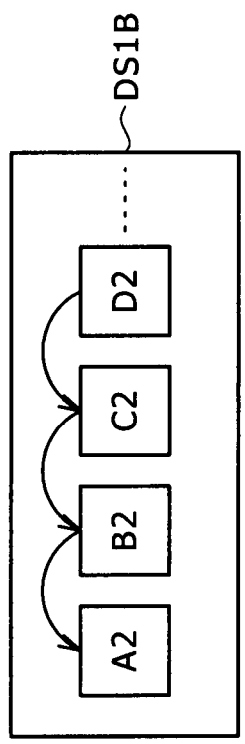
Figure 4C:
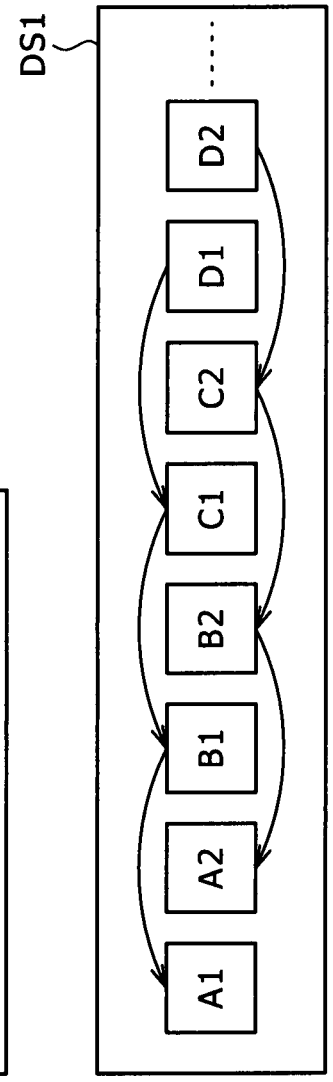

FIGS. 4A to 4C show a case example where encoded data DS1A and DS1B of two channels are synthesized. As shown in FIGS. 4A to 4C, when the respective pictures of the encoded data DS1A and DS1B of plural channels are selected on a picture basis to thereby synthesize these data into single-channel data, the reference relationship among consecutive pictures is changed as a result of the synthesis. In FIGS. 4A to 4C, each of symbols A1 to D1 and A2 to D2 indicates a picture, and the reference relationship among the pictures is indicated by the arrowheads. Therefore, in the encoded data DS1A and DS1B of two channels in the example of FIGS. 4A to 4C, each picture refers to the immediately previous picture. However, if the encoded data DS1A and DS1B of two channels are synthesized into single-channel data, each picture in the single-channel data refers to the previous picture next to the immediately previous picture. Therefore, it is difficult for the reference relationship information set in the encoded data DS1A and DS1B of the respective channels to correctly express this reference relationship in the data DS1.

To address this, the synthesizer 7 redefines the frame identifiers (frame num) in the reference picture list (ref pic list) set in a slice header as shown in FIGS. 5A and 5B so that the reference relationship in the encoded data DS1 arising from the synthesis into single-channel data can be correctly indicated. Specifically, the synthesizer 7 redefines the frame identifiers (frame num) in the reference picture list (ref pic list) correspondingly to the above-described setting of the frame identifiers (frame num).

Referring back to FIG. 1, the receiving apparatus 4 receives the encoded data DS1 transmitted from the sending apparatus 3 via its communication unit (not shown), and inputs the received encoded data DS1 to a decoder 8. The decoder 8 is a decoding unit in accordance with H.264. The decoder 8 decodes the encoded data DS1 into the original video data DV1 and outputs the video data DV1 to a monitor device or the like.

(2) Operation of Embodiment

In the above-described configuration, the video data DV1 at a high frame rate is subjected to encoding processing in accordance with H.264 in the sending apparatus 3, so that the encoded data DS1 is transmitted to the receiving apparatus 4 via the communication path 2. Therefore, unless an improvement is made in the moving image transmission system 1, an encoder that can execute high-speed processing is necessary for the encoding processing of the video data DV1 at a high frame rate.

However, in the moving image transmission system 1, consecutive pictures of the video data DV1 at a high frame rate are distributed by the distributor 5 in the sending apparatus 3 into plural channels sequentially and cyclically, so that the video data DV1 is converted into the video data DV1A to DV1N at a low frame rate. In the moving image transmission system 1, the video data DV1A to DV1N at a low frame rate are subjected to encoding processing in the encoders 6A to 6N, respectively, so that the encoded data DS1A to DS1N are produced. These encoded data DS1A to DS1N are synthesized into single-channel data by the synthesizer 7, followed by being sent out.

Therefore, in this moving image transmission system 1, even when the video data DV1 at a high frame rate is to be encoded and transmitted, the encoders 6A to 6N, which actually execute the encoding processing, are allowed to encode the video data DV1A to DV1N at a low frame rate. Thus, it is possible to execute encoding processing for the video data DV1 at a high frame rate with use of the encoders 6A to 6N that each involve difficulty in high-speed processing.

Furthermore, in this moving image transmission system 1, the encoding processing is executed in accordance with H.264 in each of the encoders 6A to 6N. Therefore, even when encoded data of plural channels are synthesized into single-channel data, compliance with the regulation of the encoding scheme can be ensured.

Specifically, if the video data DV1 is divided into plural channels and encoded, followed by being synthesized into single-channel data and output, like the first embodiment, a picture separate by plural pictures from the current picture is used as the reference picture, instead of the immediately previous or subsequent picture, in the single-channel encoded data DS1 resulting from the synthesis. Therefore, in the case of employing an encoding scheme in which an immediately previous or subsequent picture is used as the reference picture, such as MPEG (Moving Picture Experts Group) 2, the regulation of the encoding scheme is not satisfied. In contrast, in H.264, a picture other than the immediately previous and subsequent pictures is also available as the reference frame. Therefore, no violation of the regulation is caused even when a picture separate by plural pictures from the current picture is used for reference like in the embodiment.

However, if the encoded data DS1A to DS1N of plural channels are synthesized like this embodiment, the frame identifiers (frame num) of the respective pictures and the reference picture list (ref pic list) that indicates the reference relationship among the pictures are different from those obtained when the input video data is encoded by one encoder. Therefore, the synthesized encoded data DS1 are difficult to be decoded by one decoder.

To address this, in the moving image transmission system 1, the information that indicates the relationship among the pictures is redefined. As a result, the synthesized encoded data DS1 is allowed to be interchangeable with encoded data obtained through encoding processing by one encoder, and thus can be decoded by one decoder that can execute high-speed processing.

Specifically, the synthesizer 7 redefines frame identifiers (frame num) so that the redefined identifies become unique to the respective pictures in the synthesized encoded data DS1 (FIGS. 2A to 2C), to thereby allow the encoded data DS1 to be interchangeable with encoded data obtained through encoding processing by one encoder, regarding frame identifiers (frame num) for specifying the respective pictures.

Furthermore, the synthesizer 7 redefines a reference picture list (ref pic list) so that the redefined list suits the reference relationship in the synthesized data (FIGS. 3 to 5), to thereby allow the encoded data DS1 to be interchangeable with encoded data obtained through encoding processing by one encoder, regarding the reference relationship among the pictures.

(3) Advantageous Effects of Embodiment

According to the above-described configuration, video data at a high frame rate is distributed into plural channels on a picture basis, and the data of each channel is encoded. This scheme allows video data at a high frame rate to be encoded with use of encoders each involving difficulty in high-speed processing. Furthermore, high processing performance that is difficult be realized by one encoder can be achieved.

In addition, when the encoded data of plural channels are synthesized into single-channel data and output, the syntax is redefined. This allows the synthesized encoded data to be interchangeable with encoded data obtained through encoding processing by one encoder.

Specifically, the information that indicates the relationship among the pictures is redefined so that the redefined information is identical to that in encoded data obtained through encoding processing by one encoder, which allows the synthesized encoded data to be interchangeable with the encoded data obtained through encoding processing by one encoder.

More specifically, frame identifiers (frame num) are redefined so that the redefined identifies become unique to the respective pictures in the synthesized encoded data, to thereby allow the synthesized encoded data to be interchangeable with encoded data obtained through encoding processing by one encoder, regarding frame identifiers (frame num).

Furthermore, a reference picture list (ref pic list) is redefined so that the redefined list suits the reference relationship in the synthesized data, to thereby allow the synthesized encoded data to be interchangeable with encoded data obtained through encoding processing by one encoder, regarding the reference relationship among the pictures.

Moreover, due to the employment of this scheme of redefining the frame identifiers (frame num) and the reference picture list (ref pic list), the interchangeability of the encoded data can be ensured through simple operation of merely rewriting slice headers partially, without changing the syntax of each macroblock, the order of access units, and so on.

Second Embodiment

FIG. 6 is a block diagram showing a moving image transmission system according to a second embodiment of the invention. In a moving image transmission system 11, the same components as those in the above-described moving image transmission system 1 of FIG. 1 are given the same numerals, and overlapping description thereof will be omitted.

In this moving image transmission system 11, a sending apparatus 13 subjects video data DV1 to encoding processing in accordance with H.264 to thereby produce encoded data DS2, and transmits the encoded data DS2 to a receiving apparatus 4. Before the encoding processing, the sending apparatus 13 thins data on a picture basis, so that the encoded data DS2 having a frame rate lower than that of the input video data DV1 is output.

Specifically, in the sending apparatus 13, a distributor 15 thins data on a picture basis for the sequentially input video data DV1, and distributes consecutive pictures into plural channels sequentially and cyclically. In this moving image transmission system 11, the number of channels into which the distributor 15 distributes input data is set to two.

Encoders 16A and 16B are encoding units in accordance with H.264. The encoders 16A and 16B encode video data DV1A and DV1B at a low frame rate output from the distributor 15, and output encoded data DS1A and DS1B.

A synthesizer 17 sequentially selects data on a picture basis from the encoded data DS1A and DS1B output from these encoders 16A and 16B correspondingly to the distribution by the distributor 15, to thereby synthesize these encoded data DS1A and DS1B into single-channel data. Furthermore, the synthesizer 17 redefines the information that indicates the relationship among the pictures, similarly to the above-described first embodiment.

According to the above-described configuration, data thins on a picture basis for video data at a high frame rate before distribution of the video data into plural channels on a picture basis and encoding of each distributed data. This scheme also allows video data at a high frame rate to be encoded with use of encoders each involving difficulty in high-speed processing. Also by this scheme, high processing performance that is difficult to be realized by one encoder can be achieved.

Third Embodiment

Figure 7:
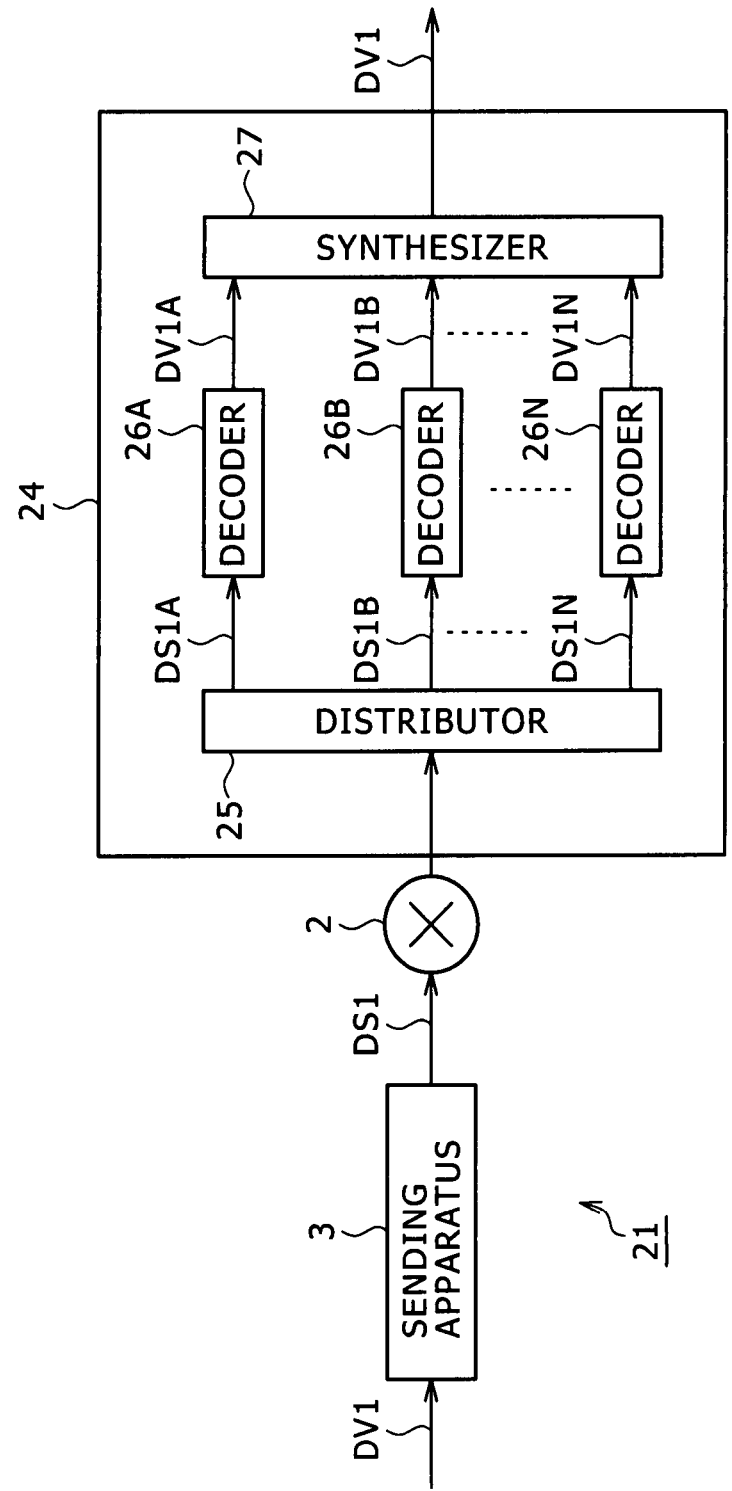
FIG. 7 is a block diagram showing a moving image transmission system according to a third embodiment of the invention.

FIG. 7 is a block diagram showing a moving image transmission system according to a third embodiment of the invention. In a moving image transmission system 21, the same components as those in the above-described moving image transmission system 1 of FIG. 1 are given the same numerals, and overlapping description thereof will be omitted. Therefore, in the moving image transmission system 21, a sending apparatus 3 distributes video data DV1 at a high frame rate into plural channels and then executes encoding processing, and thereafter synthesizes the encoded data into single-channel data and outputs the synthesized data, similarly to the moving image transmission system 1 of the first embodiment. However, the sending apparatus 3 may encode the video data DV1 at a high frame rate with use of one encoder.

In this moving image transmission system 21, a receiving apparatus 24 receives encoded data DS1 transmitted from the sending apparatus 3 via its communication unit (not shown). The receiving apparatus 24 decodes the received encoded data DS1 into the original video data DV1, and outputs the video data DV1 to a monitor device or the like.

Before this decoding processing, the receiving apparatus 24 distributes the encoded data DS1 on a picture basis sequentially and cyclically to thereby convert the encoded data DS1 into encoded data DS1A to DS1N at a low frame rate. Subsequently, the receiving apparatus 24 decodes each of the encoded data DS1A to DS1N at a low frame rate.

Specifically, in this receiving apparatus 24, a distributor 25 distributes the respective pictures of the sequentially input encoded data DS1 into plural channels sequentially and cyclically, to thereby convert the encoded data DS1 at a high frame rate into the encoded data DS1A to DS1N at a low frame rate. In this embodiment, the number of channels into which the distributor 25 distributes the encoded data is set identical to the number of channels in the sending apparatus 3. Alternatively, the number of channels may be different from that on the transmission side.

Decoders 26A to 26N are decoding units in accordance with H.264. The decoders 26A to 26N decode the encoded data DS1A to DS1N at a low frame rate and output bit streams of video data DV1A to DV1N, respectively.

A synthesizer 27 selects data on a picture basis sequentially and cyclically from the video data DV1A to DV1N output from the decoders 26A to 26N correspondingly to the distribution by the distributor 25, to thereby synthesize these video data into single-channel data. One of the plural channels of the video data DV1A to DV1N may be used to create thumbnail images.

According to the above-described configuration, encoded data at a high frame rate is distributed into plural channels on a picture basis, and the data of each channel is decoded. This scheme allows encoded data at a high frame rate to be decoded with use of decoders each involving difficulty in high-speed processing. Furthermore, high processing performance that is difficult be realized by one decoder can be achieved.

Fourth Embodiment

Figure 8:
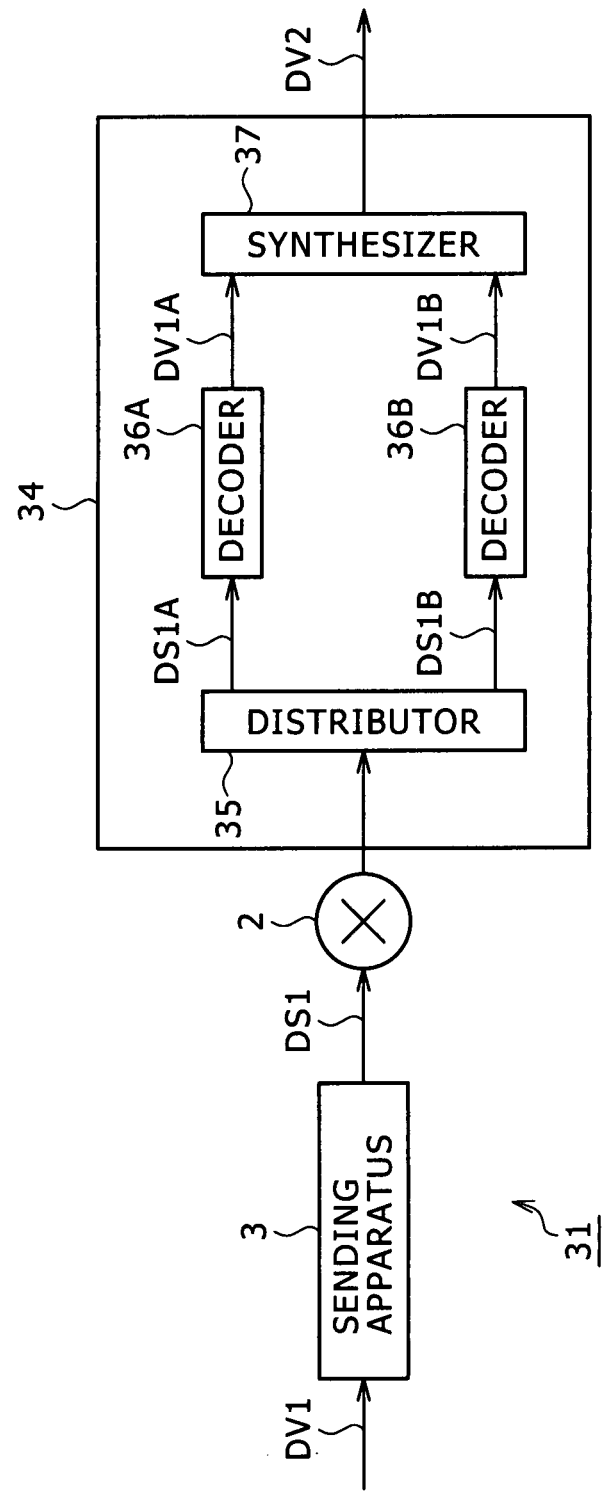
FIG. 8 is a block diagram showing a moving image transmission system according to a fourth embodiment of the invention.

FIG. 8 is a block diagram showing a moving image transmission system according to a fourth embodiment of the invention. In a moving image transmission system 31, the same components as those in the above-described moving image transmission systems 1 and 21 of FIGS. 1 and 7 are given the same numerals, and overlapping description thereof will be omitted.

In this moving image transmission system 31, a receiving apparatus 34 receives encoded data DS1 transmitted from a sending apparatus 3 via its communication unit (not shown). The receiving apparatus 34 decodes the received encoded data DS1 to thereby output video data DV2. Before the decoding processing for the encoded data DS1, the receiving apparatus 34 thins data on a picture basis, so that the video data DS2 having a frame rate lower than that of video data DV1 input to the sending apparatus 3 is output.

Specifically, in this receiving apparatus 34, a distributor 35 thins data on a picture basis for the sequentially input encoded data DS1. Furthermore, the distributor 35 distributes the respective pictures of the encoded data resulting from the discrete reduction into plural channels sequentially and cyclically. In this moving image transmission system 31, the number of channels into which the distributor 35 distributes encoded data is set to two, which is smaller than the number of channels into which the sending apparatus 3 distributes input data.

Decoders 36A and 36B are decoding units in accordance with H.264. The decoders 36A and 36B decode encoded data DS1A and DS1B at a low frame rate output from the distributor 35, and output bit streams of video data DV1A and DV1B.

A synthesizer 37 selects data on a picture basis sequentially and cyclically from the bit streams of the video data DV1A and DV1B output from the decoders 36A and 36B correspondingly to the distribution by the distributor 35, to thereby synthesize these bit streams into single-channel data.

According to the above-described configuration, data are thinned on a picture basis for encoded data at a high frame rate before distribution of the encoded data into plural channels on a picture basis and decoding of each distributed data. This scheme also allows encoded data at a high frame rate to be decoded with use of decoders each involving difficulty in high-speed processing. Also by this scheme, high processing performance that is difficult to be realized by one decoder can be achieved.

Fifth Embodiment

Figure 9:
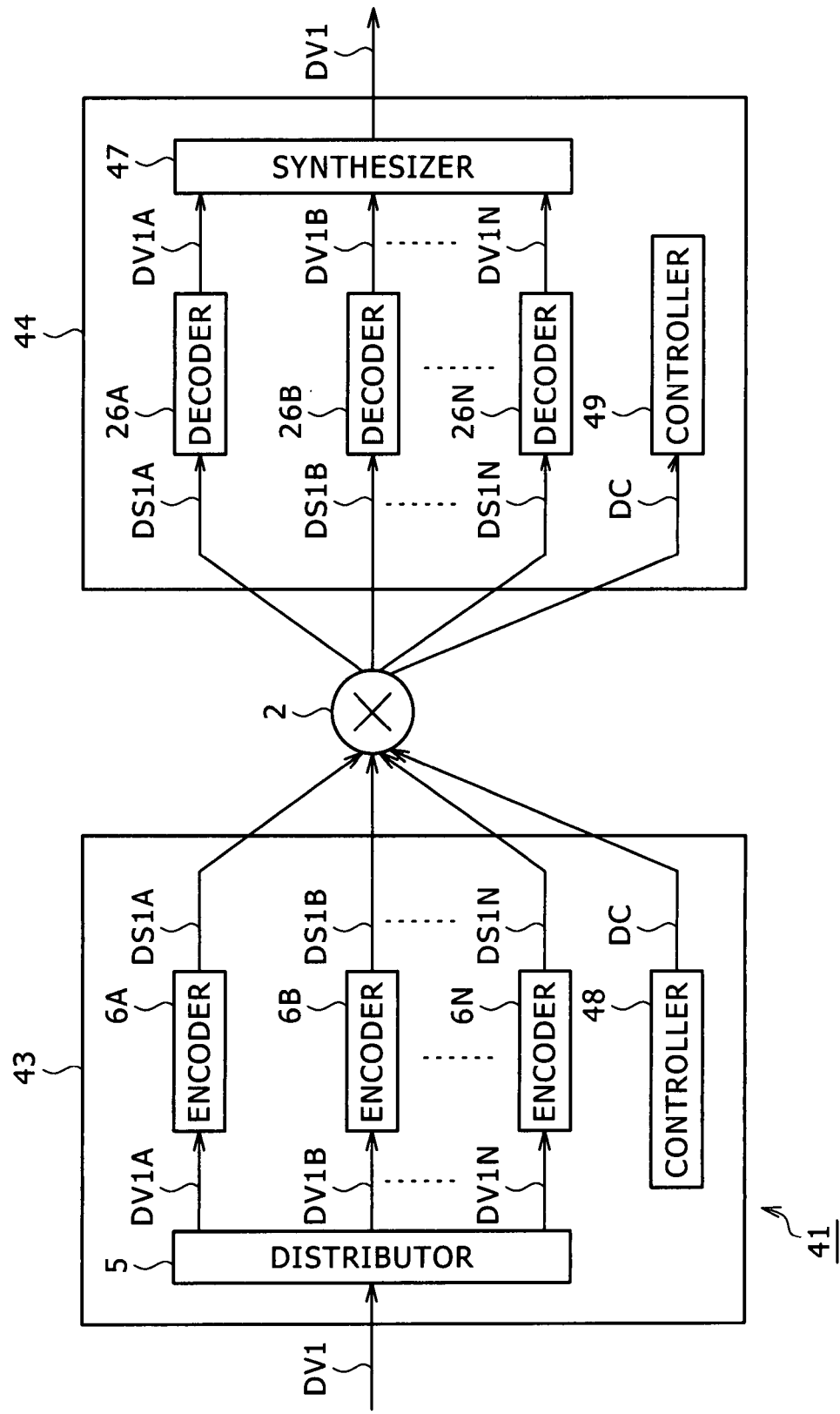
FIG. 9 is a block diagram showing a moving image transmission system according to a fifth embodiment of the invention.

FIG. 9 is a block diagram showing a moving image transmission system according to a fifth embodiment of the invention. In a moving image transmission system 41, the same components as those in the above-described moving image transmission systems 1 and 31 of FIGS. 1 and 8 are given the same numerals, and overlapping description thereof will be omitted.

In this moving image transmission system 41, a sending apparatus 43 transmits encoded data DS1A to DS1N produced by encoders 6A to 6N to a receiving apparatus 44 via a communication path 2, without synthesizing the respective encoded data into single-channel data.

In the sending apparatus 43, a controller 48 notifies the receiving apparatus 44 of information DC necessary for processing of the plural encoded data DS1A to DS1N via the communication path 2 through which the encoded data DS1A to DS1N are transmitted, or via a communication path, such as a telephone line, different from the communication path 2 through which the encoded data DS1A to DS1N are transmitted. The information DC necessary for processing of the encoded data DS1A to DS1N is information that is necessary to decode the encoded data of plural channels and synthesize the respective decoded data into single-channel video data. Specifically, the information includes the frame rate of input video data DV1, the number of the encoded data DS1A to DS1N and the identifies thereof necessary to specify the encoded data DS1A to DS1N, the priority of the encoded data necessary for the synthesis, the time information of the respective pictures, and so on.

Billing information may be contained in the information DC so that billing can be done when the original input video data DV1 is created through syntheses in the receiving apparatus 44. Furthermore, the information DC, which is necessary for processing of the encoded data DS1A to DS1N, to be supplied to a user who is to view a moving image with payment may be set different from that to be supplied to a user who is to view a free moving image. Specifically, to a user who is to view a free moving image, the controller 48 supplies such the information DC necessary for processing of the encoded data DS1A to DS1N that a part of the encoded data DS1A to DS1N can be received, decoded, and synthesized. In contrast, to a user who is to view a moving image with payment, the controller 48 supplies such the information DC necessary for processing of the encoded data DS1A to DS1N that all of the encoded data DS1A to DS1N can be received, decoded, and synthesized.

A controller 49 in the receiving apparatus 44 is a computer that controls the operation of the respective components in the receiving apparatus 44. The controller 49 acquires from the sending apparatus 43 the information DC necessary for processing of the encoded data DS1A to DS1N. The controller 49 controls the respective components based on the acquired information DC so that the encoded data DS1A to DS1N are received and decoded by decoders 26A to 26N, respectively. Furthermore, the controller 49 controls a synthesizer 47 based on the acquired information DC so that video data DV1A to DV1N at a low frame rate output from the decoders 26A to 26N are synthesized into single-channel data.

According to the fifth embodiment, video data at a high frame rate is distributed into plural channels on a picture basis before encoding processing, and then the plural encoded data are directly sent out. This scheme also allows video data at a high frame rate to be processed with use of encoders and decoders each involving difficulty in high-speed processing.

In addition, the information DC necessary for processing of the encoded data of the plural channels is separately transmitted. Variously setting this information DC can variously control the manner of viewing a moving image on the receiver side. Specifically, for example, the frame rate of video data resulting from decoding on the receiver side can be controlled so that the rate is different between free video and paid video.

Sixth Embodiment

In the above-described embodiments, consecutive pictures are distributed into plural channels sequentially and cyclically, followed by being encoded and decoded. However, the embodiment of the present invention is not limited thereto. The bottom line is that data are distributed into plural channels on a picture basis. Therefore, consecutive GOPs may be distributed into plural channels sequentially and cyclically for example.

In the above-described fifth embodiment, the number of channels of encoded data to be processed on the receiver side is dynamically switched based on control by the transmission side. However, the embodiment of the present invention is not limited thereto. The number of channels of data to be encoded on the transmission side may be dynamically switched based on control by the transmission side. Furthermore, the number of channels of encoded data to be decoded on the receiver side may be dynamically switched based on control by the receiver side. In the case of dynamically switching the number of channels of encoding processing on the transmission side based on control by the transmission side, the number of channels may be switched depending on the frame rate of video data, specifically, may be switched depending on whether the frame rate is 120 [fps] or 60 [fps]. Alternatively, the number of channels may be switched depending on the bandwidth that is available at the communication path. In the case of dynamically switching the number of channels of decoding on the receiver side based on control by the receiver side, the number of channels may be switched depending on the performance of an external apparatus that outputs video data, such as a monitor device.

In the above-described embodiments, encoding processing is executed in accordance with H.264. However, the embodiment of the invention is not limited thereto but can be widely applied to encoding processing based on any of various encoding schemes in which a picture other than the pictures that are immediately previous and subsequent to the current picture is also available as the reference picture.

In the above-described embodiments, video data is processed by a hardware configuration. However, the invention is not limited thereto but can be widely applied also to processing of video data through processing by software. If video data is processed through processing by software, the following configuration is available. Specifically, each of encoders and decoders is constructed by arithmetic processing means, and video data is processed with slave arithmetic processing means being controlled by master arithmetic processing means, or with the arithmetic processing means serving as the encoders and decoders being controlled by another control arithmetic processing means. In this case, a program of the arithmetic processing means may be provided with being recorded in any of various recording media such as optical disks, magnetic disks, and memory cards, or alternatively may be provided via a network such as the Internet.

In addition, the above-described embodiments relate to a moving image transmission system for transmitting moving images. However, the embodiment of the invention is not limited thereto but can be widely applied also to recording of moving images in a recording medium, reproduction of moving images from a recording medium, and so on.

The embodiment of present invention can be applied to processing of video data in accordance with e.g. H.264.

It should be understood by those skilled in the art that various modifications, combinations, sub-combinations and alternations may occur depending on design requirements and other factors insofar as they are within the scope of the appended claims or the equivalent thereof.

What is claimed is:

1. An encoding apparatus that executes encoding processing for input video data, comprising:
  an arithmetic hardware processor implementing
  a distributor to distribute the input video data into a plurality of channels on a picture basis; and
  a plurality of encoders to be provided on the plurality of channels and each execute encoding processing for video data of a corresponding one of the plurality of channels output from the distributor,
  for each of the plurality of channels each frame of video data is cross-referenced to a frame number within synthesized video data, the synthesized video data being synthesized from encoded video data of the plurality of channels, the cross-reference being stored in a reference picture list that is used when decoding a frame of the synthesized video data to select a reference frame of the synthesized video data corresponding to the frame being decoded,
  wherein for each macroblock of the frame being decoded a frame identifier is set, and when the macroblock is decoded the frame identifier is cross-referenced to a frame number within the synthesized video data, such that the reference picture list is used to cross-reference frame identifiers to frame numbers on a macroblock-by-macroblock basis.

2. The encoding apparatus according to claim 1, further comprising:
a synthesizer to synthesize encoded data of the plurality of channels output from the plurality of encoders into single-channel encoded data on a picture basis, and output the single-channel encoded data.

3. The encoding apparatus according to claim 2, wherein the synthesizer defines information that indicates a relationship among pictures in the single-channel encoded data so that the information is identical to information in encoded data obtained through encoding processing by one encoder.

4. The encoding apparatus according to claim 3, wherein the information that indicates a relationship among pictures is frame identifiers that specify each of the pictures, and
the synthesizer defines the frame identifiers in the single-channel encoded data so that each of the frame identifiers is unique to a corresponding one of the pictures.

5. The encoding apparatus according to claim 3, wherein the information that indicates a relationship among pictures is a reference picture list that indicates a reference relationship among the pictures, and
the synthesizer defines the reference picture list in the single-channel encoded data so that the defined reference picture list suits a reference relationship obtained after synthesis.

6. The encoding apparatus according to claim 2, further comprising:
a recording unit to record the single-channel encoded data output from the synthesizer.

7. The encoding apparatus according to claim 2, further comprising:
a communication unit configured to execute data communication,
wherein the single-channel encoded data output from the synthesizer is sent out from the communication unit.

8. A decoding apparatus that decodes input encoded data and outputs video data, comprising:
an arithmetic hardware processor implementing
a distributor to distribute the input encoded data into a plurality of channels on a picture basis; and
a plurality of decoders to be provided on the plurality of channels and each execute decoding processing for encoded data of a corresponding one of the plurality of channels output from the distributor,
for each of the plurality of channels each frame of video data is cross-referenced to a frame number within synthesized video data, the synthesized video data being synthesized from encoded video data of the plurality of channels, the cross-reference being stored in a reference picture list that is used when decoding a frame of the synthesized video data to select a reference frame of the synthesized video data corresponding to the frame being decoded,
wherein for each macroblock of the frame being decoded a frame identifier is set, and when the macroblock is decoded the frame identifier is cross-referenced to a frame number within the synthesized video data, such that the reference picture list is used to cross-reference frame identifiers to frame numbers on a macroblock-by-macroblock basis.

9. The decoding apparatus according to claim 8, further comprising:
a synthesizer to synthesize video data of the plurality of channels output from the plurality of decoders into single-channel video data on a picture basis, and output the single-channel video data.

10. The decoding apparatus according to claim 8, further comprising:
a reproducing unit,
wherein the input encoded data is data reproduced by the reproducing unit.

11. The decoding apparatus according to claim 8, further comprising:
a communication unit configured to execute data communication,
wherein the input encoded data is data received by the communication unit.

12. An encoding method for executing encoding processing for input video data, the method comprising the steps of:
distributing the input video data into a plurality of channels on a picture basis; and
encoding video data of each of the plurality of channels obtained through the distributing using respective encoders,
for each of the plurality of channels each frame of video data is cross-referenced to a frame number within synthesized video data, the synthesized video data being synthesized from encoded video data of the plurality of channels, the cross-reference being stored in a reference picture list that is used when decoding a frame of the synthesized video data to select a reference frame of the synthesized video data corresponding to the frame being decoded,
wherein for each macroblock of the frame being decoded a frame identifier is set, and when the macroblock is decoded the frame identifier is cross-referenced to a frame number within the synthesized video data, such that the reference picture list is used to cross-reference frame identifiers to frame numbers on a macroblock-by-macroblock basis.

13. A decoding method for decoding input encoded data to output video data, the method comprising the steps of:
distributing the input encoded data into a plurality of channels on a picture basis; and
decoding encoded data of each of the plurality of channels obtained through the distributing using respective decoders,
for each of the plurality of channels each frame of video data is cross-referenced to a frame number within synthesized video data, the synthesized video data being synthesized from encoded video data of the plurality of channels, the cross-reference being stored in a reference picture list that is used when decoding a frame of the synthesized video data to select a reference frame of the synthesized video data corresponding to the frame being decoded,
wherein for each macroblock of the frame being decoded a frame identifier is set, and when the macroblock is decoded the frame identifier is cross-referenced to a frame number within the synthesized video data, such that the reference picture list is used to cross-reference frame identifiers to frame numbers on a macroblock-by-macroblock basis.

14. A non-transitory computer-readable recording medium in which a program of an encoding method for executing encoding processing for input video data through implementation of arithmetic processing means is recorded, the program comprising the steps of:
distributing the input video data into a plurality of channels on a picture basis; and encoding video data of each of the plurality of channels obtained through the distributing using respective encoders, for each of the plurality of channels each frame of video data is cross-referenced to a frame number within synthesized video data, the synthesized video data being synthesized from encoded video data of the plurality of channels, the cross-reference being stored in a reference picture list that is used when decoding a frame of the synthesized video data to select a reference frame of the synthesized video data corresponding to the frame being decoded, wherein for each macroblock of the frame being decoded a frame identifier is set, and when the macroblock is decoded the frame identifier is cross-referenced to a frame number within the synthesized video data, such that the reference picture list is used to cross-reference frame identifiers to frame numbers on a macroblock-by-macroblock basis.

15. A non-transitory computer-readable recording medium in which a program of a decoding method for decoding input encoded data to output video data through implementation of arithmetic processing means is recorded, the program comprising the steps of:

distributing the input encoded data into a plurality of channels on a picture basis; and decoding encoded data of each of the plurality of channels obtained through the distributing using respective decoders, for each of the plurality of channels each frame of video data is cross-referenced to a frame number within synthesized video data, the synthesized video data being synthesized from encoded video data of the plurality of channels, the cross-reference being stored in a reference picture list that is used when decoding a frame of the synthesized video data to select a reference frame of the synthesized video data corresponding to the frame being decoded, wherein for each macroblock of the frame being decoded a frame identifier is set, and when the macroblock is decoded the frame identifier is cross-referenced to a frame number within the synthesized video data, such that the reference picture list is used to cross-reference frame identifiers to frame numbers on a macroblock-by-macroblock basis.

* * * * *